3,320,283
PHENYLCYCLOHEXYLMETHYLAMINE
COMPOUNDS
Erik Fred Godefroi, Turnhout, Belgium, assignor to Parke, Davis & Company, Detroit, Mich., a corporation of Michigan
No Drawing. Filed July 6, 1965, Ser. No. 469,847
5 Claims. (Cl. 260—326.87)

This application is a continuation-in-part of my co-pending application Ser. No. 259,381, filed Feb. 18, 1963, now abandoned.

This invention relates to new methylamine compounds and to means for producing the same. More particularly, the invention relates to methylamine compounds and acid addition salts thereof which in their free base form have the formula:

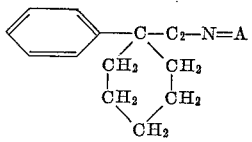

where —N=A represents an ethylamino, propylamino or pyrrolidino group.

In accordance with the invention, the methylamine compounds having the above formula where —N=A is an ethylamino or propylamino group are prepared by alkylation of 1-phenyl-cyclohexanemethylamine. The alkylation can be carried out using methods normally employed for the alkylation of primary amines, such as alkylation with the appropriate alkyl ester (e.g., ethyl or propyl halide or diethyl or dipropyl sulfate). The alkylation can also be carried out in step-wise fashion by first acylating the primary amine and then reducing the carbonyl groups in the amido compound so produced. Further, the alkylation can be carried out by reductive alkylation wherein the primary amine is first reacted with acetaldehyde or propionaldehyde and the reaction mixture is then subjected to catalytic hydrogenation.

Alkylation with an alkyl ester is carried out by treating the primary amine in a suitable organic solvent such as alcohol, tetrahydrofuran, dimethylformamide or ether, with an equivalent quantity or slight excess of the alkyl ester. The reaction is favorably carried out in the presence of base such as an alkali metal or alkaline earth metal hydroxide. Preferably, the reaction is run at room temperature but, if desired, higher temperatures up to about 50° C. may be employed.

Alkylation by way of acylation of the primary amine and reduction of the amide is carried out by using acetic or propionic acid, or its chloride, anhydride or methyl or ethyl ester. In the case of acylation with an acid, the reactants are incorporated with a suitable solvent such as water, xylene, hydrocarbon or halogenated hydrocarbon and heated until the solvent is driven off. Alternatively, the reaction mixture can be heated in a high boiling solvent under a water trap until the distillation of water is complete. The reaction is conveniently carried out at a temperature of 150 to 300° C. If desired, the intermediate amide product can be isolated and purified, or reduced directly in the reaction medium. Acylation of the primary amine with an acyl chloride is accomplished at a temperature of 0 to 50° C. in a suitable solvent such as benzene, xylene, ether, tetrahydrofuran, glycol ethers and dimethylformamide; with an anhydride a solvent of the same type and a temperature of 25 to 150° C. are usually employed; and with an ester the same or similar solvent and a temperature of 50 to 100° C. are employed.

Reduction of the amide is preferably carried out using lithium aluminum hydride. Conveniently, the latter is added in either to a mixture of the amide in an inert solvent such as a dialkyl ether or glycol ether or mixture thereof whereupon the reaction mixture is maintained under anhydrous conditions for sufficient time (i.e., 4 to 24 hours at 0 to 25° C. or 1 to 8 hours at reflux temperature) to complete the reaction, following which the reaction mixture is decomposed with an aqueous medium such as water. Reduction can also be carried out using hydrogen under pressure with copper chromium oxide catalyst. Preferably, the reduction is run at between 200 to 300 atmospheres and a temperature of 200 to 250° C., using dioxane as a solvent.

For the reductive alkylation, the primary amine and the aldehyde are reacted in an organic solvent such as alcohol, tetrahydrofuran or dimethylformamide and the reaction mixture hydrogenated in the presence of metal catalyst. When using a noble metal catalyst, a hydrogen pressure of 1 to 5 atmospheres and temperature of 25–50° C. are employed; with Raney nickel catalyst, a pressure of 80 to 110 atmospheres and temperature of 75 to 125° C. are used.

Also in accordance with the invention, the products which contain a pyrrolidino group are prepared by acylating the primary amine with succinic acid and subjecting the resulting imide to reduction, in the same manner described above for N-alkylation by way of the amide.

The methylamine compounds of the invention can be reacted in free base form with an inorganic or organic acid to provide the corresponding acid addition salt. Some examples of the salts which can be prepared in this manner are the mineral acid salts such as the hydrochloride, hydrobromide, sulfate and phosphate; organic acid salts such as succinate, benzoate, acetate and p-toluenesulfonate; and salts with other strong acids such as the sufamate. The invention contemplates such salts broadly. Those salts which are unsuited to particular uses, as for example uses where toxicity is a problem, are nevertheless useful as intermediates, being readily convertible to non-toxic acid addition salts by means which per se are known to those skilled in the art.

The products of the invention when administered orally or parenterally produce a stimulant effect upon the central nervous system. Hence, they have application as analeptic agents. For this purpose, the products in pharmaceutically acceptable acid addition salt form are preferred.

The invention is illustrated by the following examples.

*Example 1*

Acetic anhydride (0.6 g.) is added to a mixture of 5.7 grams of 1-phenyl-cyclohexanemethylamine and 25 ml. of benzene. The reaction mixture is allowed to stand for one hour, and then evaporated to dryness under reduced pressure. The crude amide is mixed with ether and then added to a mixture of 5 grams of lithium aluminum hydride and 400 ml. of ether. The resulting mixture is refluxed three hours and allowed to stand for 16 hours. It is decomposed with water, sodium hydroxide and then water, and filtered. Treatment of the ether solution with propanolic hydrogen chloride yields the hydrochloride of N - ethyl - 1 - phenylcyclohexanemethylamine, M.P. 208–209° C., after recrystallization from methanol-ether mixture.

If desired, the free base can be prepared from the hydrochloride salt by dissolving the salt in water, making the solution alkaline with sodium hydroxide solution, and extracting the free base with ether. Evaporation of the ether extracts yields the desired free base of N-ethyl-1-phenylcyclohexanemethylamine.

A water-soluble monohydrobromide is obtained by treating a solution of the free base in a small quantity of isopropyl alcohol with an equivalent of hydrogen bromide in isopropyl alcohol.

*Example 2*

Propionic anhydride (6.0 ml.) is added to a solution of 7.45 g. of 1-phenylcyclohexanemethylamine in 50 ml. of methylene dichloride. The mixture is allowed to stand for 18 hours, washed with dilute hydrochloric acid, and then dilute sodium hydroxide. The methylene dichloride fraction is dried over magnesium sulfate and evaporated under reduced pressure. A solution of the residue obtained in 50 ml. of ether is added slowly to 4.5 g. of lithium aluminum hydride in 400 ml. of ether, and the resulting mixture is stirred for 8 hours. After standing for 16 hours, the mixture is decomposed with 4 ml. of water, 3.2 ml. of 20% sodium hydroxide, and 14 ml. of water, and then filtered to remove insoluble material. Addition of an excess of isopropanolic hydrogen chloride to the ether fraction yields the desired 1-phenyl-N-propylcyclohexanemethylamine hydrochloride; M.P. 204–205° C.

If desired, the free base can be prepared by dissolving the monohydrochloride salt in water, treating the solution with an excess of sodium hydroxide solution and extracting with ether. After drying, the ether extracts are evaporated to yield the desired 1-phenyl-N-propylcyclohexanemethylamine.

A water-soluble citrate is obtained by mixing a solution of the free base in methanol with a solution of citric acid in methanol and concentrating the mixture to a small volume.

*Example 3*

A mixture of 11.4 g. of 1-phenylcyclohexanemethylamine, 7.05 g. of succinic acid, and 40 ml. of water are heated on a metal bath until all of the water is driven off. The external temperature at this point is 270° C. After cooling, the residue is recrystallized from ethanol; M.P. 130–131° C.

7.6 grams of the above product is mixed with ether and introduced into 7 g. of lithium aluminum hydride in 700 ml. of ether over a period of 4 hours. The mixture is then stirred for 16 hours. The resulting mixture is decomposed with water, sodium hydroxide and then additional water. After filtering off the insoluble salts, the ether layer is treated with an excess of hydrogen chloride in isopropanol to yield the hydrochloride of 1-(1-phenylcyclohexylmethyl)pyrrolidine. It was recrystallized from a mixture of ether and methanol; M.P. 219–220° C.

If desired, the free base can be obtained by dissolving the above hydrochloride salt in water, adding an excess of dilute sodium hydroxide and extracting with ether. Evaporation of the ether yields the desired product, 1-(1-phenylcyclohexylmethyl)pyrrolidine.

I claim:
1. A compound selected from the group consisting of a free base and its pharmaceutically acceptable acid addition salts, said free base having the formula:

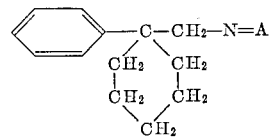

where —N=A is selected from the group consisting of ethylamino, propylamino and pyrrolidino.

2. The hydrochloride salt of N-ethyl-1-phenylcyclohexanemethylamine.

3. N-ethyl-1-phenyl-cyclohexanemethylamine in pharmaceutically acceptable acid addition salt form.

4. N-propyl-1-phenyl-cyclohexanemethylamine.

5. 1-(1-phenylcyclohexylmethyl)pyrrolidine.

References Cited by the Examiner

UNITED STATES PATENTS 3,097,207   7/1963   Maddox et al. _____ 260—313

OTHER REFERENCES

Hori, Pharm. Soc. of Japan, vol. 78, 1958, pp. 11–14.
Sergievskays et al., Chem. Abstracts, vol. s–3, 1959; pp. 1196g–1197.
German Auslegeschrift, 1,124,485, 3–1962.

ALEX MAZEL, *Primary Examiner.*

MARY O'BRIEN, *Assistant Examiner.*

UNITED STATES PATENT OFFICE

CERTIFICATE OF CORRECTION

Patent No. 3,320,283                             May 16, 1967

Erik Fred Godefroi

It is hereby certified that error appears in the above numbered patent requiring correction and that the said Letters Patent should read as corrected below.

Column 1, lines 19 to 24, for that portion of the formula reading

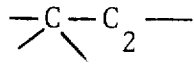          read          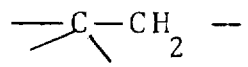

column 2, line 37, for "sufamate" read -- sulfamate --.

Signed and sealed this 15th day of October 1968.

(SEAL)
Attest:

Edward M. Fletcher, Jr.                        EDWARD J. BRENNER
Attesting Officer                              Commissioner of Patents